June 19, 1934.  C. S. BROWN  1,963,487
AIR COOLED ENGINE CYLINDER BLOCK
Filed Aug. 12, 1932
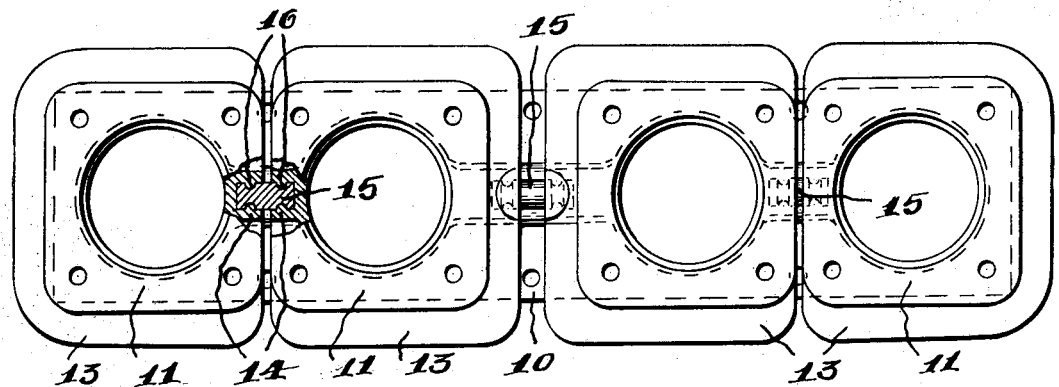
Fig-1-
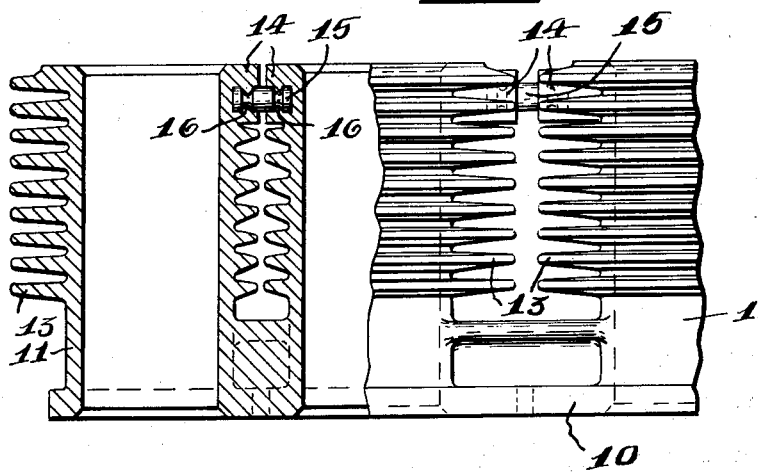
Fig-2-
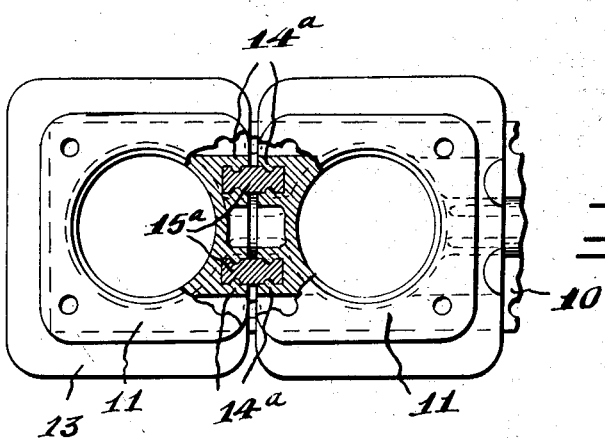
Fig-3-
INVENTOR.
Charles S. Brown
BY Bodell + Thompson
ATTORNEYS.

Patented June 19, 1934

1,963,487

UNITED STATES PATENT OFFICE 1,963,487

AIR COOLED ENGINE CYLINDER BLOCK

Charles S. Brown, Syracuse, N. Y.

Application August 12, 1932, Serial No. 628,533

3 Claims. (Cl. 123—171)

This invention relates to multi-cylinder engine blocks for air cooled engines, and has for its object a particularly simple and efficient means for holding the cylinders in juxtaposition during the machining operations performed on the cylinders, and during the operation of the engine, and particularly the locating of said means within the width of the engine block, or between adjacent cylinders, in contradistinction to outside the limits of the engine block proper, or tangent to the cylinders, as in my pending application, Sr. No. 573,127, filed November 5, 1931.

The invention consists in the novel features and in the combinations and constructions hereinafter set forth and claimed.

In describing this invention, reference is had to the accompanying drawing, in which like characters designate corresponding parts in all the views.

Figure 1 is a plan view, partly in section, of an engine block embodying this invention.

Figure 2 is a fragmentary side elevation, partly in section.

Figure 3 is a fragmentary view, similar to Figure 1, of a modified form of the invention.

In air cooled engines, because it is necessary to circulate air around the cylinders individually, it has not been thought practical to cast a plurality of cylinders en bloc. Also, because air cooled engines are subject to greater variations of temperature than water cooled engines, the cylinders can not be connected together by masses of metal, as in water cooled engines, because variations in expansion and contraction in air cooled engines being greater than in water cooled, due to greater variations in temperature, cause misalinement or distortion of cylinders relatively to each other in the normal use of the engine.

One arrangement of tie bars connecting the cylinders is shown in my pending application referred to in which the tie bars are located outside the engine block and secured to lugs on the outer sides of the block so that the tie bars are tangent to the cylinders, or the heat radiating flanges thereon.

The object of this invention is an air cooled cylinder construction by which a plurality of air cooled cylinders can be machined and assembled in the engine as a unit, but with the tie bars located within the normal widthwise dimension of the engine block, or between the cylinders and their flanges, as distinguished from being located outside the cylinders and their flanges.

The air cooled multi-cylinder block here illustrated is of the type in which the cylinder heads are detachable and comprises a base 10 common to a plurality of cylinders 11 and integral therewith, the cylinders having heat radiating flanges 13 here shown as arranged horizontally relatively to the cylinders and extending between the cylinders, and tie bars connecting adjacent cylinders and located between the cylinders.

These tie bars comprise lugs 14 formed on the cylinders and integral therewith near the head ends thereof, or remote from the base 10, the lugs preferably projecting from the barrels of the cylinders between adjacent heat radiating flanges, instead of on the flanges, and the lug on one cylinder being spaced apart from the end of the lug on the adjacent cylinder, and a connecting piece 15 embedded in the lugs and tying them together. This connecting piece 15 is preferably of a plug metal having a relatively low coefficient of expansion, as invar steel, and is placed in the lugs 14 during the casting operation. It is formed with peripheral grooves 16, or other indentations, to receive the molten metal when the cylinders are being poured, so that the lugs are firmly interlocked with the connecting piece. Preferably, as shown in Figure 1, the lugs 14 are located radially relatively to the cylinders and midway between the planes of the sides of the cylinder block.

As shown in Figure 3, each pair of cylinders is connected by two pairs of lugs 14$^a$, and connecting pieces 15$^a$, these being located on opposite sides of a plane common to the axis of all the cylinders, but within planes tangent to the outer lateral sides of the cylinders. The cylinders with their bases and lugs are cast integral, and the invar connecting pieces 15 located in the mold prior to casting, so that the engine block is a unit, and the cylinders are firmly supported from getting out of alinement during the machining operations, and during the use of the engine when the cylinders are subject to varying temperatures.

What I claim is:

1. A multi-cylinder block for air cooled engines including a plurality of spaced apart cylinders having heat radiating flanges, a base common to the cylinders and integral therewith, tie pieces connecting the cylinders and located in the space between two adjacent cylinders, said tie pieces being of a metal having a small coefficient of expansion compared with that of the metal of the cylinders and base.

2. A multi-cylinder block for air cooled engines including a plurality of spaced apart cylinders having peripheral radiating flanges, a base common to the cylinders and integral therewith, tie bars connecting the tops of the cylinders composed of a metal having a smaller coefficient of expansion compared with the metal of the cylinders and the base, said tie bars projecting from the cylinder into the space between the cylinders.

3. A multi-cylinder block for air cooled engines including a plurality of spaced apart cylinders having peripheral radiating flanges, a base common to the cylinders and integral therewith, tie bars connecting the tops of the cylinders composed of a metal having a smaller coefficient of expansion compared with the metal of the cylinders of the base, said tie bars projecting from the cylinder into the space between the cylinders, and located between the cylinders on opposite sides of a plane containing the axes of the cylinders.

CHARLES S. BROWN.